United States Patent [19]

Terao et al.

[11] Patent Number: 5,368,986
[45] Date of Patent: Nov. 29, 1994

[54] INFORMATION RECORDING MEDIA, MANUFACTURING METHOD FOR THE SAME, AND INFORMATION RECORDING METHOD

[75] Inventors: Motoyasu Terao, Hinode; Keikichi Andoo, Musashino; Shigenori Okamine, Kodaira; Yasushi Miyauchi, Akishima; Masahiko Takahashi, Kodaira; Masaaki Futamoto, Kanagawa; Reiji Tamura, Ibaraki, all of Japan

[73] Assignees: Hitachi, Ltd., Tokyo; Hitachi Maxell, Ltd., Osaka, both of Japan

[21] Appl. No.: 878,976

[22] Filed: May 6, 1992

Related U.S. Application Data

[63] Continuation-in-part of Ser. No. 694,492, May 2, 1991, abandoned.

[30] Foreign Application Priority Data

May 8, 1991 [JP] Japan ................................. 3-102508

[51] Int. Cl.$^5$ ................................................ B32B 3/00
[52] U.S. Cl. ........................... 430/270; 430/495; 430/945; 369/275.4; 369/275.1; 369/284
[58] Field of Search ............ 430/270, 495, 945; 369/275.1, 275.4, 288, 284

[56] References Cited

U.S. PATENT DOCUMENTS

| | | | |
|---|---|---|---|
| 4,422,159 | 12/1983 | Craighead et al. | 369/275.1 |
| 4,719,594 | 1/1988 | Young et al. | 430/945 |
| 4,731,755 | 3/1988 | Bjorklund et al. | 369/284 |
| 4,788,097 | 11/1988 | Ohara et al. | 430/945 |
| 4,811,331 | 3/1989 | Gerber | 369/275.4 |
| 4,841,515 | 6/1989 | James | 369/288 |
| 4,893,298 | 1/1990 | Pasman et al. | 369/275.4 |
| 4,893,299 | 1/1990 | Humberstone et al. | 369/275.4 |
| 4,984,231 | 1/1991 | Yasuoka et al. | 430/945 |
| 5,115,424 | 5/1992 | Nakajima et al. | 369/275.4 |
| 5,170,390 | 12/1992 | Ohta et al. | 369/288 |
| 5,204,852 | 4/1993 | Nakagawa et al. | 369/275.4 |
| 5,220,556 | 6/1993 | Shimuzu | 369/275.4 |

FOREIGN PATENT DOCUMENTS

| | | | |
|---|---|---|---|
| 63-127445 | 5/1988 | Japan | 369/275.4 |
| 329133 | 2/1991 | Japan | 369/275.4 |

OTHER PUBLICATIONS

Craighead et al. "Textured Ge Optical Storage Medium." Appl..Phys. Lett. 40(8) Apr. 1982 662-664.
Ohta et al., "Million Cycle Overwritable Phase Change ORM." SPIE 1078 (1989) 27-34.

*Primary Examiner*—Charles L. Bowers, Jr.
*Assistant Examiner*—Martin Angebranndt
*Attorney, Agent, or Firm*—Antonelli, Terry, Stout & Kraus

[57] ABSTRACT

By using an information recording medium comprising at least a substrate and an information recording film which is mounted on the above substrate and changes the physical property under irradiation of a recording energy beam, wherein the surface of the information recording area of the above substrate is uneven, both surfaces of the above recording film are also uneven, and an inorganic protective layer is provided in contact with the surface of the above recording film opposite to the above substrate, fine recording points can be formed stably without complicated control of the recording power and recording waveform so that an optical disk unit can record data simply in high density.

8 Claims, 5 Drawing Sheets

INFORMATION RECORDING MEDIA, MANUFACTURING METHOD FOR THE SAME, AND INFORMATION RECORDING METHOD

This is a continuation-in-part application of Ser. No. 07/694,492 filed May 2, 1991, now abandoned.

BACKGROUND OF THE INVENTION

The present invention relates to information recording media for recording analog signals of images and sounds, which are frequency modulated, and digital information such as computer data, facsimile signals, and digital audio signals in real time by recording energy such as a laser beam, electron beam, and electric current.

There are a variety of principles for recording on the thin film by energy beam such laser beam, and because the recording by phase change between amorphous and crystalline materials, between crystalline and crystalline materials, and between amorphous and amorphous materials, recording by reactions between the upper and lower layers (alloying) and magneto-optical recording are hardly accompanied with changes of film configuration, their advantages are that a double sided disk comprising two disks pasted together is formed and that records can be rewritten.

However, the recording by phase change has the problem that the rewriting cyclability is restricted due to the flow of the recording film when a record is rewritten many times. This is because in melting the recording film for amorphization, the recording film side of the protecting layers on both sides of the recording film expands by heat and the opposite side does not expand by heat so much as the recording film so that the protecting film expands toward the recording film and consequently the recording film is pressed and flows toward the portion at a lower temperature. When recording laser power is particularly high, the recording film partially evaporates, so that the effect of pressing the recording film increases. Although the flow by a single recording is quite slight, if the same position on the recording track is melted repeatedly many times, the film thickness of that part decreases thereby causing a read-out error. Thinning the recording film as countermeasure for this problem has been proposed in the proceeding volume 1078 (1989) of Society of Photo Optical Instrumentation Engineers (SPIE), pp. 27–34 (hereinafter referred to as the first conventional technology). According to this method, by thinning the recording film, the heat capacity of the recording film is decreased so as to prevent the deformation of the upper and lower protective layers due to the rise of temperature and the flow speed of the recording film is reduced by the adhesive force of a melted recording film to the upper and lower protective layers and viscosity.

The production of less than 100 nm uneven surface by etching germanium (Ge) film by reactive ion has been publicized in Applied Physics Letter volume 40, No. 8, pp. 662–664 "Textured Germanium Optical Storage Medium" (hereinafter referred to as the second conventional technology) and U.S. Pat. No. 4,422,159 (hereinafter referred to as the third conventional technology). While only the recording by deformation of the recording film with uneven surface is described in the second conventional technology, the third conventional technology mentions the recording by oxidation of the recording film as well as the recording by deformation of the recording film.

Furthermore, a recording method that pit arrays closely filled in the recording track direction are formed on the plastic substrate surface of an optical disk, a mixture of fine metallic particles and paraffine are filled in each pit of the pit arrays and covered with a protective layer, and the distribution of fine particles is changed by applying a magnetic field and heating by a laser beam is indicated in U.S. Pat. No. 4,841,515.

However, although the first conventional technology has improved the rewriting cyclability as compared with relatively thick recording film, it cannot realize the unlimited multiple rewriting required when used as a computer file memory because it does not block the flow completely. The second and third conventional technologies are not able to rewrite recordings because recording is done by deformation or oxidation of the recording film, thus the application is limited. Additionally, the characteristic is likely to change due to the oxidation of the film surface and the service life for storage is short. This is because no protective film is formed or if any, organic protective film which oxygen is easy to pass and likely to deform by heat is formed on the uneven surface side. Thus the second and third conventional technologies do not guarantee multiple rewriting although they enable recording by thermal deformation or oxidation.

The fourth conventional technology has disadvantages that the reproduced signal quality is low because no recording material is formed on protrusions of the substrate and the protective layer is easy to separate because the surface of the protective layer on the recording film side is flat and hence little effective in preventing deformation of the recording film. Comparing with these technologies, this invention enables multiple rewriting because the flow of recording film due to energy beam radiation on the recording film can be prevented almost completely as inorganic protective film with a high melting point is provided on the uneven surface, and the protective film gets into the bents of the uneven surface.

Furthermore, the present invention realizes good reproduced signal quality because the signal level is high and the noise level is low.

On the other hand, magneto-optical recording produces a large diffusion of heat in horizontal direction (recording film inside direction) due to the high coefficient of thermal conductivity, so that a recording point faithful to recording signal is difficult to form. The axis of easy magnetization is difficult to be set completely at right angle to the film surface.

SUMMARY OF THE INVENTION

One of the objects of the present invention is to provide an information recording medium (member) which enables multiple rewriting with high sensitivity and a long life time.

The second object of the present invention is to provide a manufacturing method for the above information recording medium.

The third object of the present invention is to provide an information recording method using the above information recording medium.

The above first object is accomplished by using:

(1) an information recording medium comprising at least a substrate and an information recording film which is mounted on the above substrate and changes the physical property under irradiation of a recording energy beam, which is characterized in that the surface of the information recording area of the above substrate is uneven, both surfaces of the above recording film are also uneven, and an inorganic protective layer is provided in contact with the surface of the above recording film opposite to the above substrate;

(2) an information recording medium according to Item (1), wherein the above recording film exists on both dents and protrusions of the above uneven surface;

(3) an information recording medium according to Item (1) or (2), wherein the size of the dents or protrusions of the above uneven surface is almost equal to the size of recording points; and (4) an information recording medium according to one of Items (1) to (3), wherein the above recording film exists little in the areas inclined to the substrate surface between the dents and protrusions of the above uneven surface.

The above second object is accomplished by using:

(5) an information recording medium manufacturing method characterized in that the above method comprises a process that an information recording film which changes the physical property under irradiation of a recording energy beam is formed on the substrate, a process that a second film wherein the ion etching speed is partially different is formed on the above recording film, and a process that the above second film is ion-etched (sputter etched), fine holes or grooves are formed in the above second film in the portion of the above uneven surface inclined to the above substrate surface, furthermore the above second film is ion-etched, and the above recording film in the portion inclined to the above substrate surface is removed.

The above third object is accomplished by using:

(6) an information recording method characterized in that information is recorded by using an information recording medium having an information recording film which changes the physical property under irradiation of a recording energy beam onto the surface of the information recordable area of the substrate which is periodically uneven and a protective layer, by obtaining a synchronizing signal from the uneven surface of the above information recording film, and by changing the intensity of the recording energy beam so that the recording point almost coincides with the dent or protrusion position of the above information recording film on the basis of the above synchronizing signal.

The present invention uses a process that an information recording film which changes the physical property under irradiation of a recording energy beam is formed on the substrate and a process that the above recording film is ion-etched, irregularities such as fine holes or grooves are formed on the surface of the above recording film, and furthermore an inorganic protective layer is formed in contact with the uneven surface. Therefore, the present invention can suppress the flow or thermal conduction generated as a side effect when the above physical property is changed. It is desirable that the full width at half maximum of the dents or protrusions of the above uneven surface whichever larger is less than a half of the full width at half maximum of the smallest of the dent indicating the address formed on the above recording film or the synchronizing signal.

Concerning the information recording member of this invention, the recording thin film may be deposited directly on a substrate or through a single layer or multiple layers of organic or inorganic protective film. The physical property of this recording thin film changes by the radiation of recording energy beam, not accompanied with a change of the film surface shape.

To provide the surface of the information recording thin film with unevenness, various methods are available. A method that the recording film is deposited in the amorphous state with a columnar structure and the portions between columns are etched without a mask layer is used or the recording film is deposited in the amorphous state with pin holes and the area around the pin holes are etched may be used. For example, making the recording thin film polycrystalline and etching from the grain boundary is a possible way. Making the recording film columnar-structured amorphous and etching from the portion between the columns, or making the recording film pinholed-structure and etching around the pinholes without using a mask layer are also possible ways. Although etching can be done using etching fluid, ion-etching (sputter etching, ion beam etching, ion milling by reactive gas or inert gas) is desirable.

Forming the second thin film having fine granular or columnar crystal grains on the recording thin film and ion-etching (sputter etching) the recording thin film by using the second thin film as a mask is a desirable method. As the method to form a thin film having fine granular or columnar crystal grains, forming a metal film easy to coagulate or having a high melting point by sputtering or deposition is a suitable method. The sputtering speed of this film under the same sputtering condition as the recording thin film is desired to be less than ⅓ the sputtering speed of the recording thin film or most desired to be less than 1/5. If the recording thin film is a phase-change recording film composed of mainly Te and Se, sputter etching is easier as compared with metal so that forming unevenness or dents is easy.

To form unevenness or dents on the recording thin film surface, photo resist or electron beam resist for short wave length (including blue light beam, ultraviolet ray, X ray, etc.) may be used. Resist is coated on the recording film directly or via other layer, fine patterns are printed by light irradiation (electron beam irradiation) and developed and then unrequired resist is removed. Then, using this resist layer as a mask, etching with etching fluid or ion-etching is done to form unevenness or dents on the recording film. After that, photo resist layers are removed. Although pattern irradiation to the said photo resist layer may be done using a contact mask, use of the interference fringes of short wave length laser beam or electron beam makes it easy to form regular patterns. Using posi-type resist provides arranged column recording thin film and using nega-type resist provides repeated lattice recording thin film.

To form protrusions and/or dents in the data recordable area on the recording film surface, the recording film surface may not necessarily be etched. A method that the base layer or substrate of the recording film is made uneven by injection molding using an uneven mold or by etching using a metal or photoresist mask and a recording film is formed on the above uneven base layer or substrate may be used. By this method, the recording film surface is also made uneven. In this case, the recording film is formed on both dents and protrusions of the uneven surface. When the size of dents or protrusions is made similar to the size of recording points and recording points are formed so that they coincide with dents or protrusions in position, noise caused by irregularities can be desirably prevented. However, an energy storage period for temperature rise is required for the recording film temperature to reach the recordable temperature after the power of an energy beam moving on the recording medium reaches the recording level. For example, therefore, to form a recording point on a dent, it is necessary to increase the energy beam power at the previous protrusion up to the recording level. Since no every storage effect can be obtained when there is not a film for absorbing the energy beam on the protrusion in this case, it is desirable that the protrusion has a recording film. It is furthermore desirable that when the recording film exists little in the areas inclining to the substrate surface between the above dents and protrusions which is, the recording point is prevented from swelling out of the dent or protrusion. The method for etching the above recording film can be used for etching the base layer or the substrate. When the substrate surface is made uneven like this, the adhesion between the base layer and the recording film, between the recording film and the protective layer, and between the substrate and the base layer is improved.

To provide the recording thin film or ground layer (bottom protective layer) mentioned above with unevenness or dents, other methods than etching can be used. For example, selective film growth can be employed. By coating the ground layer with island shaped metallic film and form recording thin film on it in order to grow the recording thin film selectively, the speed of forming the recording thin film is increased on the island shaped metallic film and the recording thin film having unevenness on its surface is obtained. And the material of the top protective layer may be grown in dents between the column recording thin film simultaneously or after the columnar recording thin film growth. On the contrary, growing the material of the top protective layer columnar and then a recording thin film in between can be applied.

As for the size of the dent (also for the unevenness, the size of the dent when treating quantitatively like this), the average of the full width at half maximum of the dent is desired to be more than 5 nm to less than 200 nm, and more desired to be more than 10 nm to less than 150 nm, and most desired to be more than 20 nm to less than 100 nm. The average of the interval between the dent and protrusion is desired to more than 5 nm to less than 600 nm, more desired to be more than 10 nm to less than 450 nm and most desired to be more than 20 nm to less than 300 nm.

Figure 11:
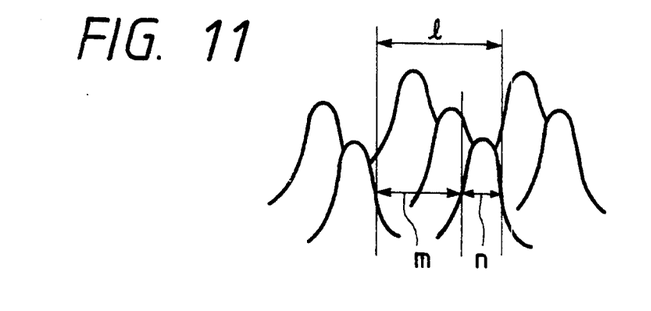
FIG. 11 is the schematic perspective view to explain the unevenness formed on the recording thin film.

Looking at protrusions of the unevenness, the average of the interval between the protrusion and protrusion is desired to be more than 5 nm to less than 200 nm, and the average of the full width at half maximum of the protrusion is desired to be more than 5 nm to less than 600 nm. As for the full width at half maximum and interval between the dents and these for the protrusions, as shown in FIG. 11, the full width at half maximum of the dent is the interval between the protrusions (m in Fig.) and the full width at half maximum of the protrusion is the interval between the dents (n in Fig.) and the period of the dent is the same as that of the protrusion (1 in Fig.).

These conditions are necessary to secure the effect of the unevenness and dents, and prevent noise from being increased when information is read by light spot whose diameter of full width at half maximum is 0.5 to 1.5 $\mu$m.

Because the protective film is desired to fill a dent completely, the thickness is desired to be from 10 nm to 300 nm. If it is less than 10 nm, effect of protection is small, and if it is more than 300 nm, cracks are likely to occur. When the recording thin film is a phase-change recording film, if a part of protrusion reaches the bottom of the recording thin film or the lower layer, for example the bottom protective layer (ground layer), that is, the recording thin film is partially cut apart, the effect is large. However, even if the dent does not reach the bottom of the recording thin film, some effect is made as compared with when no dent is formed.

If the recording thin film is a phase-change recording film, partial insertion of the protective layer on the recording thin film into the said dent is effective for restricting the flow of the recording thin film. After the upper protective layer is formed, the unevenness of the protective layer surface may be weakened or eliminated by sputter etching the surface of the protective layer. In the case of the magneto-optic recording thin film composed of two layers, after the first layer of the magnetic recording thin film is formed, unevenness are formed on the surface, and then the second layer of the magnetic recording thin film different from the said recording thin film in terms of magnetic characteristics is formed. In this case, the said unevenness may reach the bottom layer of the recording thin film but it is more desirable that it does not reach it.

Next, ion-etching the dent of the surface, flattening the surface of the film and make island shaped recording thin films of different characteristic coexist on the same plane is effective for controlling the magnetic characteristics. Even if the second layer is not etched, the recording thin film can be used. In the case of the recording thin film composed of multiple layers, after an appropriate number of layers are formed, protrusions and dents are formed on the surface and then the remaining layers may be formed or protrusions and dents may be formed at the interface of multiple layers. When unevenness are formed on a substrate or bottom protective layer also, the recording thin film formed on it has surface unevenness, which is a desirable effect. Forming protrusions and dents after the recording thin film is formed completely also produces an effect. For the recording thin film by reaction between layers and mutual diffusion, above-mentioned various methods for the photo-electro-magnetic recording thin film are also effective.

The said second thin film acting as the mask to form the said unevenness of desired dimension on the said recording thin film surface is desired to be such a film having fine granular or columnar crystal grains, and the average of the center distance between those crystal grains is desired to be more than 10 nm to less than 800 nm and more desired to be more than 20 nm to less than 600 nm. The diameter of the crystal grain is desired to be more than 50% the center distance and more desired to be more than 80%. The second thin film as mask can be not continuous film but island shaped uncontinuous film. If the crystal grain is read as the island at this time, the condition about the size mentioned above is the same.

The thickness of the second thin film acting as the said mask is desired to be more than 5 nm to less than 600 nm, and more desired to be more than 10 nm to less than 450 nm. Of the island shaped uncontinuous film, the average film thickness may be smaller than this. The melting point of the second thin film is desired to be more than 150° C. to less than 4,000° C., more desired to be more than 1,200° C. to less than 3,600° C. and most desired to be 1,400° C. to less than 3,400° C.

Meanwhile, if the coefficient of thermal conductivity of the said recording thin film is very small, when the metallic film which is the second thin film acting as mask is formed, the temperature of the recording thin film surface rises so that it is difficult to form the second thin film having uniform fine granular or columnar crystal grains. In this case, by forming a thin film composed of mainly a metallic element having a high coefficient of thermal conductivity as the ground of the mask and then a thin film having a lower coefficient of thermal conductivity than the ground of the mask, the second thin film having fine granular or columnar crystal grains can be formed easily.

The coefficient of thermal conductivity of the second thin film acting as the said mask is desired to more than 6 W/m.K to less than 420 W/m.K and more desired to be more than 20 W/m.K to less than 250 W/m.K.

The coefficient of thermal conductivity of the mask ground layer composed of mainly the said metallic element is desired to be more than 200 W/m.K to less than 430 W/m.K and the film thickness is desired to be more than 2 nm to less than 50 nm.

The second thin film acting as the said mask is desired to be a thin film composed of mainly a metallic element but may be a compound thin film of oxide, nitride, sulfide, selenide, fluoride and carbide.

The second thin film is desired to be composed of at least one of the group including Al, Si, Ti, V, Cr, Mn, Fe, Co, Ni, Cu, Zn, Ge, Zr, Nb, Mo, Tc, Ru, Rh, Pd, Ag, In, Sn, Sb, Te, Hf, Ta, W, Re, Os, Ir, Pt, Au, Tl, Pb, Bi and C. Further, it is especially desirable to use at least one selected out off the group including Ti, V, Cr, Fe, Co, Ni, Zr, Nb, Mo, Tc, Ru, Rh, Pd, Hf, Ta, W, Re, Os, Ir, Pt and C. The material of the protective layer is desired to be made of inorganic insulating (dielectric) material such as oxide, sub-oxide, sulfide, nitride, selenide, boride and carbide and of such a material that allows reading laser to pass through. If the melting point or softening point is higher than the material of the recording film, it is more desirable.

Example of such materials are those whose composition is close to one or mixture of more than two of $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $Ta_2O_5$, $Sc_2O_3$, $Y_2O_3$, $TiO_2$, $ZrO_2$, $CdS$, $CdSe$, $ZnS$, $(ZnS)_{80}(SIO_2)_{20}$, $ZnSe$, $In_2S_3$, $In_2Se_3$, $Sb_2S_3$, $Sb_2Se_3$, $Ga_2S_3$, $Ga_2Se_3$, $MgF_2$, $CeF_2$, $CaF_2$, $GeS$, $GeSe$, $Gese_2$, $SnS$, $SnSe$, $PbS$, $PbSe$, $Bi_2S_3$, $Bi_2Se_3$, $TaN$, $Si_3N_4$, $AlN$, $Si$, $Ti$, $B_4C$, $SiC$, $BN$, $B$ and $C$.

If organic substance is used as the material of the protective layer, melting, softening or decomposition is likely to occur due to the heat at the time of recording, so that the recording film is likely to be deformed or flow. In addition, because oxygen and water are allowed to pass through, the recording film is likely to be oxidized, so that the performances for recording, rewriting and reading cannot be maintained stably. In case the recording thin film is a phase-change recording thin film, the average of the film thickness is desired to be more than 5 nm to less than 120 nm, and more desired to be more than 10 nm to less than 50 nm. If the recording thin film is a magneto-optic recording film, the average of the film thickness is desired to be more than 10 nm to less than 400 nm, and especially desired to be more than 20 nm to less than 200 nm. In both cases, the average thickness mentioned here refers to the film thickness assuming that the unevenness of the recording thin film is flattened.

This invention includes the method to remove the recording film in the grooves for tracking or at the inclines to the bottom of the groove or at the inclines of pits formed on the recording track by the processes similar to the above-mentioned processes. In these cases, the fact that the structure of the recording film itself or the structure of the second thin film (it can be the top protective layer of the recording film) is perturbed and easily etched. In these cases, the condition that the larger full width at half maximum of the protrusion or dent of the uneven surface is less than $\frac{1}{2}$ the smaller full width at half maximum of the dent representing the address or synchronizing signal formed on the substrate is not necessarily fulfilled because in this case, noise does not increase.

By forming an unevenness or dents on the surface of the recording thin film, the flow, heat conduction in horizontal direction and expansion of lines of magnetic force can be prevented. Additionally, the crystal grain diameter can be limited, and noises and erase-remainder can be reduced. With the increase of the surface area, the adhesion between the recording thin film and other layer is improved.

DETAILED DESCRIPTION OF THE PREFERRED EMBODIMENT

Embodiment of This Invention

The embodiments of this invention is explained below by means of drawings.

Embodiment 1

Figure 1:
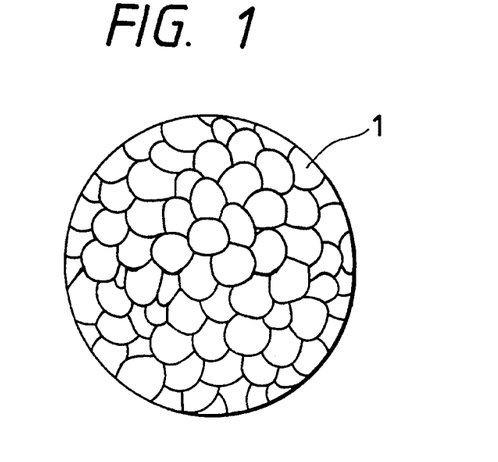
FIG. 1 is the plan of the polycrystalline Ti film which is the second thin film formed on the recording thin film of the information recording member which is an embodiment of this invention.
Figure 3:
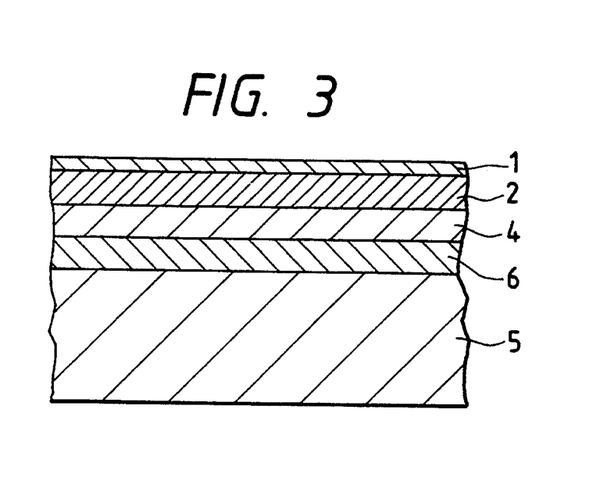
FIG. 3 is the cross section of a portion to explain the manufacturing process of the information recording member which is an embodiment of this invention.

On the disk shaped poly-carbonate substrate 5 on whose surface a tracking groove and the pit (not illustrated) indicating address are formed at the time of injection molding, as shown in FIG. 3, about 100 nm thick $Al_2O_3$ film which was the second bottom protective layer 6 having a high coefficient of thermal conductivity was formed by magnetron sputtering, about 120 nm thick $(ZnS)_{80}(SiO_2)_{20}$ film which is the first bottom protective layer having a low coefficient of thermal conductivity, the phase-change recording thin film 5 composed of about 60 nm thick Ge-Sb-Te was formed on it, and further as the second thin film 1 for masking, the Ti film about 20 nm in averaged thickness was formed. This Ti film was granular poly-crystalline film as shown in FIG. 1.

Figure 2:
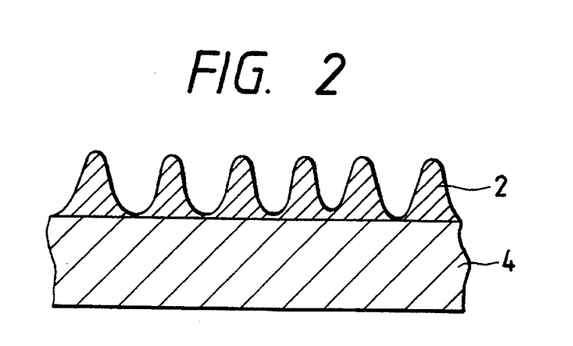
FIG. 2 is the cross section of the portion of the recording thin film having unevenness.

Then, this disk was sputter etched using argon gas at the gas pressure of 10 mTorr. At this time, the portion between the crystals of the second thin film 1, in particular, was etched so that the second thin film becomes island shaped. The recording thin film between the islands of Ti was etched by continuing to etch further. Although the second island shaped thin film 1 becomes thinner and smaller gradually by etching, etching was continued for a while after the film disappears completely. Consequently, an unevenness whose cross section was shown in FIG. 2 was formed on the recording thin film 2 and a part of the cross section reached the first bottom protective layer 4. At this time, the average thickness of the recording thin film 2 was 25 nm. Although etching could be stopped with the Ti island remaining slightly, in this case, a slight change of characteristic due to the diffusion of Ti into the recording thin film by rewriting many times was noticed. Meanwhile, for etching, argon-oxygen gas may be used or C CL2 F2 may be added to argon-oxygen gas.

Figure 4:
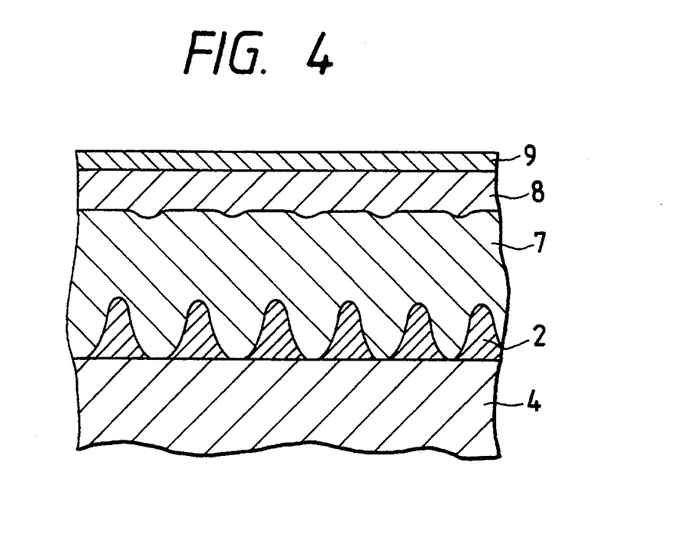
FIG. 4 is the cross section of a portion of the information recording member which is an embodiment of this invention.

After etching, as shown in FIG. 4, about 210 nm thick $(ZnS)_{80}(SiO_2)_{20}$ film of the top protective layer 7 was formed by magnetron sputtering and then, as the metal reflection layer, about 100 nm thick $Al_{96}Cu_4$ film was formed. Next, UV-light curing resin 9 was coated and hardened by radiating ultraviolet ray. Finally, another disk produced in the same manner was bonded together with the said ultraviolet ray hardened resin facing inside. The Cu content of the $Al_{96}Cu_4$ film was 1 to 45 atom %, producing an excellent characteristic and this is effective even when no dents are formed on the recording film also.

As a result of observing the cross section of the disk by means of a scanning electron microscope, it was found that the $(ZnS)_{80}(SiO_2)_{20}$ film went into the portion digged by the sputter etching of the recording thin film and the effect of blocking a melted recording thin film flow could be expected.

The recording and reproduction of information on a disk formed in the said manner was performed in the following manner. With the disk rotating at 1,800 rpm, the light of semiconductor laser (wave length: 830 nm) maintained on a level not to record (1 mW), it was concentrated by the lens in the recording head and radiated to a recording thin film through the substrate. By detecting a reflection light, automatic focusing was performed so that the focal point comes onto the recording thin film and tracking was performed to always locate the center of optical spot in between tracking grooves.

Next, a recording was performed by changing laser power according to information signal to be recorded between 6 mW causing crystallization and 15 mW where a change to the condition near non crystal. As the recording signal, signals of a specific frequency or digital data signal was used. Of the recorded portion, the point near non crystal was considered as a recording point. Even if this recording method was executed to an already recorded portion, recorded information is rewritten to newly recorded information. Of course, a recording by power modulated irradiation after erasing by continuous radiation at a certain power is permitted.

Reading out was performed in the following manner. With a disk rotating at 1,800 rpm, tracking and automatic focusing were performed like recording time, the intensity of reflection light was detected by 1 mW laser beam and regenerative signal was obtained. This regenerative signal was put into the spectrum analyzer and the ratio between a recorded specific frequency information signal (carrier) and noise was obtained.

The recording thin film was produced at the thickness of 25 nm without forming the Ti film of the second thin film. The increase of noise in the regenerative signal when overwriting was performed on the conventional disk having a recording thin film without unevenness on its surface and the disk which is an embodiment of this invention is as follows.

| Rewriting time | Noise level | |
| --- | --- | --- |
| | Disk of the present embodiment | Conventional disk |
| Initial time | −71 dBm | −73 dBm |
| $10^3$ | −71 dBm | −73 dBm |
| $10^4$ | −71 dBm | −71 dBm |
| $10^5$ | −71 dBm | −68 dBm |
| $10^6$ | −71 dBm | −63 dBm |
| $4 \times 10^6$ | −71 dBm | Not measured |

It is evident that the characteristic of rewriting many time has been improved by the formation of unevenness.

Sputter etching was performed by changing the Ti film formation condition and heat treatment condition after the formation and further changing the size of Ti film crystal grain diameter. As a result of the experiment of changing the shape of the unevenness of the recording thin film, the increase of noise after the disk of this embodiment was rewritten $10^6$ times when comparing the noise level recorded initially of the conventional disk was less than 6 dB in the range that the half width of the dent (width at half the maximum depth and the average, the same for the subsequent description) is more than 5 nm to less than 200 nm and that the interval between the dents (distance between the centers of the neighboring dents and the average, the same for the subsequent description) is more than 5 nm to less than 600 nm. And the increase of noise after rewriting $10^6$ times was less than 3 dB in the range that the average of the half width of the dents is more than 10 nm to less than 150 nm and that the average of the intervals between the dents was more than 10 nm to less than 450 nm. Further the increase of noise after rewriting $10^6$ times was less than 2 dB in the range that the average of the full width at half maximum of the dents is more than 20 nm to less than 100 nm and that the average of the intervals between the dents was more than 20 nm to less than 300 nm. The erasing ratio at the time of overwriting (reduction ratio of the signal level of previously written signals) was improved from the conventional disk 30 dS to 33 dB in the embodiment of this invention.

When as other method, an island shaped Ti film was formed on the surface of the first bottom protective layer and recording thin film was formed on it by vacuum evaporation, the recording thin film grew up selectively at the initial period of vacuum evaporation and recording thin film having unevenness on the surface could be obtained. When the top protective layer and reflection layer were formed in the same manner mentioned above, almost the same characteristics of recording and reading were obtained.

When unevenness was formed by using ultra multilayer structured magneto-optic recording thin film with about 1.5 nm thick Pt film and Co film deposited alternately as recording thin film, the effect that magnetization perpendicular to film surface was made easy arose.

When unevenness was formed on the surface of the recording thin film such as the multi-layered films of $Bi_2Te_3$ and $Sb_2Se_3$ by reactions between the layers, alloying and mutual diffusion, faithful regenerative signals to recording signals could be obtained as the effect.

When a part or all of the thin film Ti used as the said mask is substituted by the substance composed mainly of at least one element chosen from the group including Al, Si, V, Cr, Mn, Fe, Co, Ni, Cu, Zn, Ge, Zr, Nb, Mo, Tc, Ru, Rh, Pd, Ag, In, Sn, Sb, Te, Hf, Ta, W, Re, Os, Ir, Pt, Au, Tl, Pb, Bi and C, the same effect was obtained. Of them, Ti, V, Cr, Fe, Co, Ni, Zr, Nb, Tc, Ru, Rh, Pd, Hf, Ta, W, Re, Os, Ir, Pt and C are especially favorable. The melting point and coefficient of thermal conduction of these materials are as shown below.

| | Melting point (°C.) | Coefficient of thermal conductivity |
|---|---|---|
| Al: | 660 | 223 W/m · K |
| Si: | 1410 | 20 W/m · K |
| Ti: | 1660 | 22 W/m · K |
| V: | 1890 | 32 W/m · K |
| Cr: | 1857 | 95 W/m · K |
| Fe: | 1535 | 84 W/m · K |
| Co: | 1495 | 100 W/m · K |
| Ni: | 1453 | 91 W/m · K |
| Cu: | 1083 | 395 W/m · K |
| Zn: | 420 | 110 W/m · K |
| Zr: | 1852 | 22 W/m · K |
| Nb: | 2468 | 51 W/m · K |
| Mo: | 2617 | 135 W/m · K |
| Tc: | 2172 | 50 W/m · K |
| Ru: | 2310 | 117 W/m · K |
| Rh: | 1966 | 151 W/m · K |
| Pd: | 1552 | 76 W/m · K |
| Ag: | 962 | 419 W/m · K |
| In: | 156 | 24 W/m · K |
| Sn: | 232 | 63 W/m · K |
| Sb: | 631 | 17 W/m · K |
| Te: | 450 | 6 W/m · K |
| Hf: | 2227 | 23 W/m · K |
| Ta: | 2996 | 57 W/m · K |
| W: | 3410 | 170 W/m · K |
| Re: | 3180 | 48 W/m · K |
| Os: | 3045 | 88 W/m · K |
| Ir: | 2410 | 160 W/m · K |
| Pt: | 1772 | 73 W/m · K |
| Au: | 1064 | 298 W/m · K |
| Tl: | 303 | 39 W/m · K |
| Pb: | 327 | 33 W/m · K |
| Bi: | 271 | 8 W/m · K |
| C: | 3550 | 80 W/m · K |

When a part or all of the first bottom protective layer $(ZnS)_{80} (SiO_2)_{20}$ of the recording thin film of the said bottom protective layer is substituted by a substance with the composition near at least one chosen from the group A consisting of ZnS, CdS, $In_2S_3$, ZnSe, CdSe, $In_2Se_3$, $SiO_2$, SiO, $TiO_2$ and $ZrO_2$ and a part or all of the second bottom protective layer $Al_2O_3$ of the substrate is substituted by the substance composed of mainly material with the composition near at least one chosen from the group B consisting of $Ta_2O_5$, $Y_2O_3$, $Si_3N_4$, AlN, $AlSiN_2$, $Al_2SiN_3$, $AlSi_2N_3$, Si-Al-O-N and SiC, the same effect was obtained. Of those, $Al_2O_3$ or Al-SiN base material is especially favorable. The coefficients of thermal conduction of these materials are as follows.

$SiO_2$: 1 W/m.K
ZnS: 2 W/m.K
$TiO_2$: 5 W/m.K
$ZrO_2$: 3 W/m.K
$Si_3N_4$: 18 W/m.K
$Al_2O_3$: 46 W/m.K
$Y_2O_3$: 15 W/m.K
AlN: 30 W/m.K
SiC: 8 W/m.K

For example, even if the first bottom protective layer was $(ZnS)_{80} (SiO_2)_{20}$ and the second bottom protective layer was $AlSiN_2$ or the first bottom protective layer was $ZrO_2$ and the second bottom protective layer was $AlSiN_2$ or the first bottom protective layer was $SiO_2$ and the second bottom protective layer was $Al_2O_3$ or the first bottom protective layer was $ZrO_2$ containing a small amount of $Y_2O_3$ and the second bottom protective layer was $Al_2O_3$, the same effect was obtained.

The coefficient of the thermal conductivity of the thin film composed of mainly oxide or sulfide of the first bottom protective layer of this embodiment is desired to more than 1 W/m.K to less than 6 W/m.K and the coefficient of the thermal conductivity of the thin film composed of mainly oxide or nitride of the said second bottom protective layer is desired to be more than 8 W/m. K to less than 60 W/m. K and most desired to be more than 10 W/m.K to less than 50 W/m.K. When the said Ge-Sb-Te phase change recording thin film was used and protective layer material with different coefficient of thermal conductivity was used, the recording laser power and the increase of noise at the time of overwriting $10^5$ times changed as follows.

| Coefficient of thermal conductivity of the second bottom protective layer (W/m · K) | Recording laser power | Increase from the minimum of the remainder |
|---|---|---|
| 6 | 12 mW | 6 dB |
| 8 | 12 mW | 3 dB |
| 10 | 13 mW | 0 dB |
| 30 | 14 mW | 0 dB |
| 50 | 15 mW | 0 dB |
| 60 | 17 mW | 0 dB |
| 70 | 19 mW | 0 dB |

Regenerative signal CN ratio more than 46 dB was obtained in the range that the product (index of refraction at the portion where the recording film exists) of the index of refraction and film thickness of the portion near amorphous of the recording thin film is more than 100 nm to less than 600 nm and the product of the index of refraction of the intermediate layer and film thickness was more than 50 nm to less than 600 nm. In the range that the film thickness of the intermediate layer is more than 150 nm to less than 300 nm, the CN ratio was more than 48 dB. The product of the index of refraction and averaged film thickness of the crystalline condition of the recording thin film may be in the said range. If the intermediate layer was not formed, the recording sensitivity dropped about 50% but the other characteristics were not affected largely and the film could be used.

Figure 5:
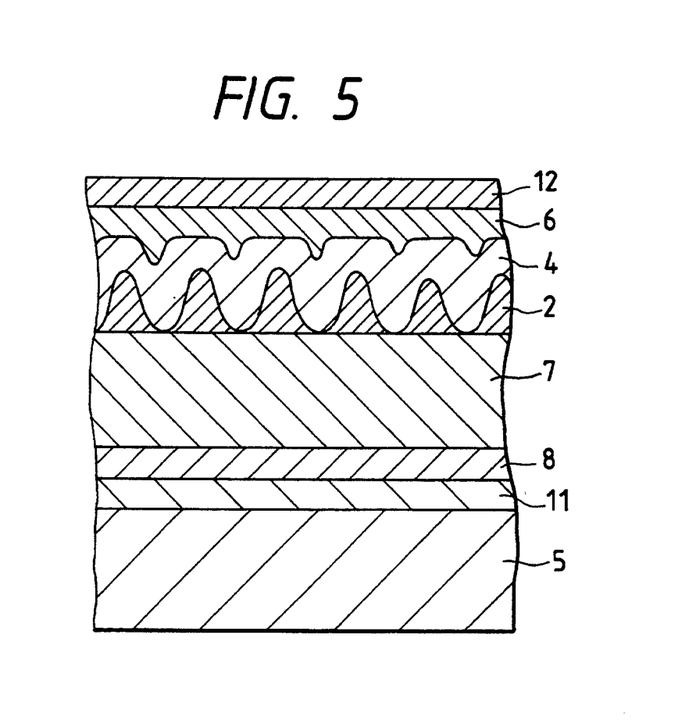
FIG. 5 is the cross section of a portion of the information recording member which is other embodiment of this invention.

Even if, as shown in FIG. 5, a guide groove was formed on the surface of the ultraviolet hardening resin 1 formed on the glass substrate 5, the same recording layer as the disk of FIG. 4 was formed in reverse order (from the AlCu film of the metallic reflection layer 8) and this film was used without bonding with another disk, almost the same effect was obtained. In this case, it is desirable to form the organic protective film 13 further on the top. However, in these cases, laser beam were taken in from the opposite side of the substrate.

Figure 6:
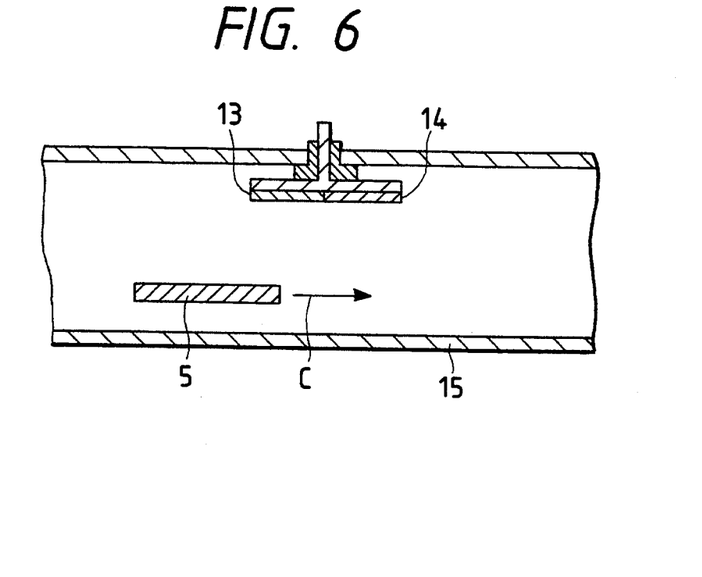
FIG. 6 is the fragmentary sectional view of the sputtering device having multiple targets.

When the first and second bottom protective layers were formed, if using the inline sputter device shown in FIG. 6, the $Al_2O_3$ target 13 and ZnS target 14 were put side by side and sputtering was performed while moving the substrate 5 in the arrow C in the sputtering chamber 15, the deposited film of $Al_2O_3$ and ZnS layers was obtained easily. The composition changes continuously in these layers.

Embodiment 2

Although a disk was formed in the same manner as the embodiment 1, Tb-Fe-Co magneto-optical recording film was used as the recording thin film.

Figure 7:
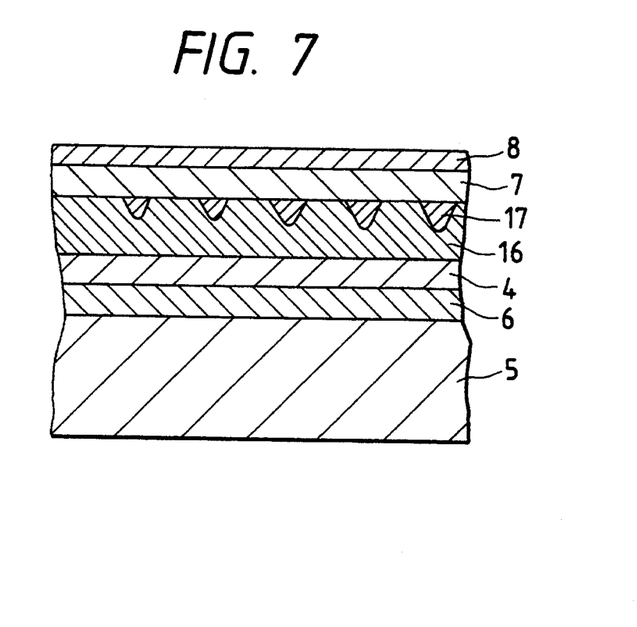
FIG. 7, FIG. 8, FIG. 9 and FIG. 10 are the cross sections of a portion of the information recording member which is other embodiment of this invention.

As shown in FIG. 7, up to the first bottom protective layer 4 was formed like the embodiment 1 and as the recording thin film 16, Tb-Fe-Co magneto-optical recording film was formed as the first recording thin film on it. Then Ti film was formed as the second thin film (not illustrated), and like the embodiment 1, unevenness having dents about ⅓ the film thickness was formed on the first recording thin film. After that, as the second recording layer 17, Tb-Dy-Fe-Co magneto-optical recording film was deposited and the protrusions on the surface of the magneto-optical recording thin film was shaved by sputter etching to flatten the surface of the film. Like the embodiment 1, the top protective layer 7 and metallic reflection layer 8 were deposited. Consequently, the second recording thin film having unevenness on the boundary.

In this embodiment, using a magneto-optical head and magnetic field, pit edge recording by making digital information 1 correspond to both ends of the recording point was performed. Reading was performed by the rotation of the plane of polarization by Kerr effect. Comparing the deviation from the edge original signal of regenerative signals with a disk on whose recording thin film no unevenness was formed, it was found that at least 5 ns was improved. In addition, the recording sensitivity was improved by about 10%.

Figure 8:
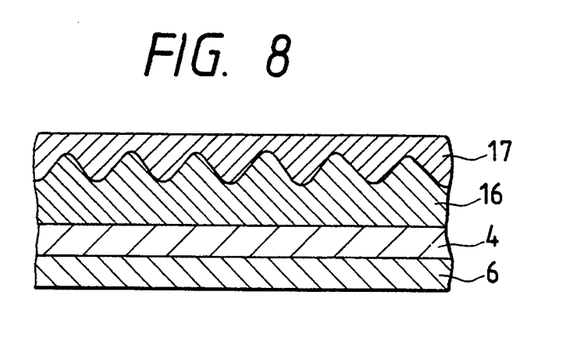
Figure 9:
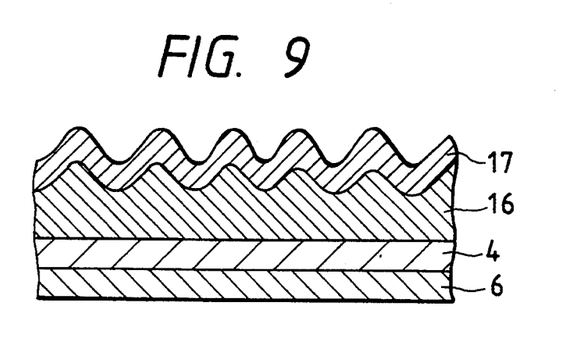
Figure 10:
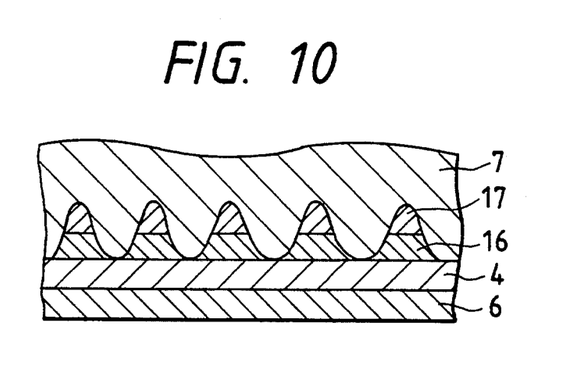

Additionally, the effect of intensified exchange coupling force was found. Thus, although overwriting was difficult when no unevenness was formed on the surface, overwriting was possible for a disk where unevenness was formed at the boundary of the recording thin films which is this embodiment. Like the disk whose only portions necessary for the explanation were shown in FIG. 8 and FIG. 9, the disk produced by weakening the degree of the second sputter etching or without the second sputter etching also performed favorable recording and reproduction. As shown in FIG. 10, the disk produced by sputter etching after the second recording thin film was formed also could be overwritten and the thermal conduction in the horizontal direction could be blocked so as to produce the effects such as the improvement of the recording sensitivity, prevention of the erasing of a neighboring track and improvement of recording point configuration.

When this embodiment was applied to the magnetic disk recording thin film which records and reads out through the magnetic head, effects such as magnetic unisotropy increase was not iced.

Embodiment 3

Figure 12:
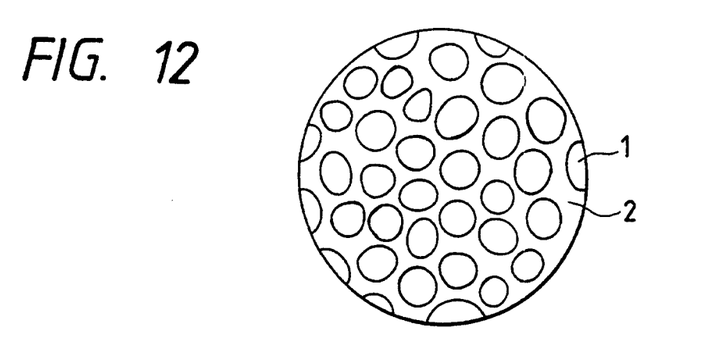
FIG. 12 is the plan of the island shaped Ti film which is the second thin film formed on the recording thin film of the information recording member which is an embodiment of this invention.

Like the embodiment 1, as shown in FIG. 3, on the disk polycarbonate substrate 5 on whose surface tracking grooves and pits indicating an address (not illustrated) were formed upon injection molding, about 100 nm thick $Al_2O_3$ layer was formed as the second bottom protective layer with a high coefficient of thermal conductivity by magnetron sputtering, then about 120 nm thick $(ZnS)_{80}$ $(SiO_2)_{20}$ layer was formed as the first bottom protective layer having a low coefficient of thermal conductivity, about 60 nm thick phase-change recording thin film 2 of Ge-Sb-Te was formed on it, and further Ti film with the averaged thickness of about 5 nm was formed as the second thin film 1 for masking. This Ti film is island shaped as shown in FIG. 12 if the thickness is as mentioned above.

Figure 13:
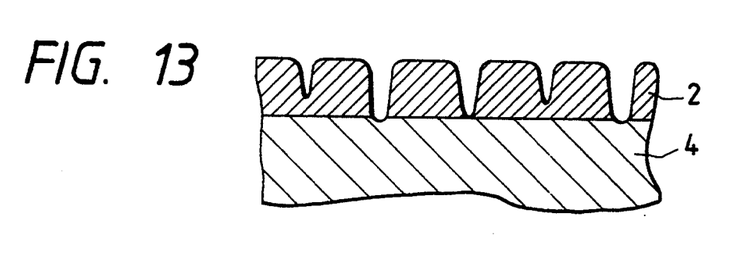
FIG. 13 is the cross section of a portion of the recording thin film having unevenness.

Next, by sputtering (ion etching) this disk reversely using argon gas containing oxygen of 20 mole % at the gas pressure of 20 mTorr, the recording thin film between the islands of Ti was etched. At this time, although the Ti island becomes smaller by etching gradually, etching was continued for a while after the island disappears completely. Consequently, an unevenness whose cross section was shown in FIG. 13 was formed on the recording thin film 2 and a part of the cross section reached the first bottom protective layer 4. At this time, the average thickness of the recording thin film was about 25 nm. Although etching could be stopped with the Ti island remaining slightly, in this case, a slight change of characteristic due to the diffusion of Ti into the recording thin film by rewriting many times was noticed. Meanwhile, for etching, pure argon gas may be used instead of argon-oxygen gas or $CCl_2F_2$ may be added to argon-oxygen gas.

After etching, about 210 nm thick $(ZnS)_{80}$ $(SIO_2)_{20}$ film of the top protective layer was formed by magnetron sputtering and then, a metal reflection layer composed of about 100 nm thick Ni-Cr was formed. Next, UV-light curing resin was coated and hardened by radiating ultraviolet ray. Finally, another disk produced in the same manner was bonded together with the said ultraviolet ray hardened resin facing inside. The Cu content of the $Al_{96}Cu_4$ film was 1 to 45 atom %, producing an excellent characteristic and this is effective when no dents are formed on the recording film also.

As a result of observing the cross section of the disk by means of a scanning electron microscope, it was found that the $(ZnS)_{80}$ $(SiO_2)_{20}$ layer went in between the recording thin films digged by ion etching and the effect of blocking the flow of a melted recording thin film was exerted.

The recording and reproduction of information on a disk formed in the said manner was performed in the same manner as the embodiment 1.

The recording thin film was produced at the thickness of 25 nm without forming the Ti film of the second thin film. The increase of regenerative signal noise when overwriting was performed between the conventional disk having a recording thin film with a little unevenness on its surface and the disk which is an embodiment of this invention is as follows.

| Rewriting time | | |
|---|---|---|
| | Noise level | |
| | Disk of the present embodiment | Conventional disk |
| Initial time | −71 dBm | −73 dBm |

-continued

| Rewriting time | Noise level | |
| --- | --- | --- |
| | Disk of the present embodiment | Conventional disk |
| $10^3$ | −71 dBm | −73 dBm |
| $10^4$ | −71 dBm | −71 dBm |
| $10^5$ | −71 dBm | −68 dBm |
| $10^6$ | −71 dBm | −63 dBm |
| $4 \times 10^6$ | −71 dBm | Not measured |

It is evident that the characteristic of multiple time rewriting more than $10^5$ has been improved by the formation of dents.

As a result of the experiment by changing the shape of the dents of the recording thin film while changing the formation condition of the Ti film which was the second thin film and the heat treatment condition after the formation, the increase of noise after the disk of this embodiment was rewritten $10^6$ times when comparing the noise level recorded initially of the conventional disk was less than 6 dB in the range that the half width of the dent (width at half the maximum depth) is more than 5 nm to less than 200 nm and that the interval between the dents (distance between the centers of the neighboring dents) is more than 5 nm to less than 600 nm. And the increase of noise after rewriting $10^6$ times was less than 3 dB in the range that the half width of the dents is more than 10 nm to less than 150 nm and that intervals between the dents was more than 10 nm to less than 450 nm. Further the increase of noise after rewriting $10^6$ times was less than 1 dB in the range that the half width of the dents is more than 20 nm to less than 100 nm and that the intervals between the dents was more than 20 nm to less than 300 nm. The erasing ratio at the time of overwriting (reduction ratio of the signal level of previously written signals) was improved from the conventional disk 30 dB to more than 33 dB in the embodiment of this invention. Although the regenerative signal error rate of less than $10^{-4}$ was obtained in the range more than 10 nm to less than 120 nm, the error rate was less than $10^{-5}$ in the range more than 15 nm to less than 50 nm.

When island shaped Ti film was formed on the surface of the first bottom protective layer as other method, and a recording thin film was formed on it by vacuum evaporation, the recording thin film grew selectively at the initial period of metallizing so that a recording thin film with an uneven surface was obtained. When the top protective layer and reflection layer were formed in the same manner as mentioned above, almost the same characteristics of recording and read-out were obtained.

Instead of the said $(ZnS)_{80}(SiO_2)_{20}$ protective layer, it is possible to use the oxide, suboxide, sulfide, nitride, selenide or carbide that is composed mainly of at least one or two elements of $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $Ta_2O_5$, $Sc_2O_3$, $Y_2O_3$, $TiO_2$, $ZrO_2$, $CdS$, $ZnS$, $CdSe$, $ZnSe$, $In_2S_2$, $In_2Se_3$, $Sb_2S_3$, $Sb_2Se_3$, $Ga_2S_3$, $Ga_2Se_3$, $MgF_2$, $CeF_2$, $CaF_2$, $GeS$, $GeSe$, $GeSe_2$, $SnS$, $SnSe$, $PbS$, $PbSe$, $Bi_2S_3$, $Bi_2Se_3$, $TaN$, $Si_3N_4$, $AlN$, $Si$, $Ti$, $B_4C$, $SiC$, $BN$, $B$ and $C$.

When a material with the composition near at least one of these or a mixture of two or more was used, almost the same effect was obtained. As for the organic protective film such as poly-methyl-methacrylate or polystyrene, the protective film was deteriorated due to rewriting by more than 10 times and the recording film flew and was deformed, and consequently the carrier to noise ratio dropped by more than 3 dB.

Embodiment 4

The same process was taken except that the recording thin film thickness was 40 nm up to the formation of a recording thin film. After posi-type ultraviolet photo resist was formed on the recording thin film, the optical beam of exima-laser was divided into two, and the resist was exposed to the interference fringes when the divided beams were crossed through each beam expander. Next, the disk was rotated 90 degrees around the rotation axis and exposed to interference fringes again. When the photo resist was developed, it was deprived of the portion irradiated by laser beam was removed and lattice was formed. Then the disk was put in the sputtering device again and the recording thin film was etched using the photo resist as mask.

After photo resist was removed by solvent, the disk was put in the sputtering device again and completed through the same process subsequent to sputtering as the embodiment 3. In the disk of this embodiment also like the embodiment 1. An increase of noise by rewriting many times was not found.

Embodiment 5

A disk was produced through the same process as the embodiment 4 and as the recording thin film, Tb-Fe-Co magneto-optical recording thin film was used. In this case, using a magneto-optical head and magneto coil, the pit edge type recording was carried out to make the digital information 1 correspond to both ends of the recording point. Read-out was performed by using the rotation of the plane of polarization by Kerr effect. Comparing the deviation of the regenerative signal edge with its original signals, it was found that at least 5 ns was improved. In addition, the recording sensitivity was improved by about 10%.

When the composition of Tb-Fe-Co magneto-optical recording thin film was changed and in an extreme case, with a thin film of only Co, the perpendicular magnetic unisotropy was reduced, the regenerative signal intensity dropped if no dents were formed on the surface, however in case of the disk on whose recording thin film surface dents were formed, which was this embodiment, the carrier to noise ratio of more than 46 dB was obtained. In case of multiple layer laminated magneto-optical recording film of Pt and Co or Pd and Co also, when dents were formed in the same manner considering all as a signal recording film, the same effect was obtained.

When dents were formed on the recording thin film such as the laminated film of $Bi_2Te_3$ and $Sb_2Se_3$ by chemical reaction between the layers, alloying and mutual diffusion, the same effect was obtained.

When this embodiment was applied to the recording of magnetic disk for recording and reading, the effect of increased perpendicular magnetic unisotropy was confirmed.

Embodiment 6

A $(ZnS)_{80}(SiO_2)_{20}$ layer about 100 nm in thickness, which is a lower protective layer, is formed by magnetron on a disk type polycarbonate substrate, which has a pit indicating address and a groove for tracking on the surface by injection molding, sputtering and a phase change type recording film about 60 nm in thickness, which comprises Ge-Sb-Te, is formed on the above layer. Then, this recording film is spatter-etched using argon gas at a gas pressure of 10 mTorr. In this case, the portion between the columns of the columnar structure of the recording film is particularly etched, the recording film is made uneven, and a part of the dents reaches the lower protective layer. In this case, the mean thickness of the recording film became 20 nm. Argon-oxygen gas may be used for etching and $CCl_2F_2$ may be added to argon-oxygen gas.

After etching, a $(ZnS)_{80}(SiO_2)_{20}$ layer about 50 nm in thickness, which is an upper protective layer, is formed additionally by magnetron sputtering and then a $Al_{96}Cu_4$ layer about 100 nm in thickness is formed as a metal reflective layer. Next, UV light curing resin is coated on it and the resin is cured by irradiation of UV light. Another disk is produced in the same way and the two disks are stuck together finally with the above UV light curing resin sides facing each other. The $Al_{96}Cu_4$ layer with a Cu content of 1 to 45 atomic % provides good characteristics. The observation of the disk cross section by a scanning electron microscope shows that the $(ZnS)_{80}(SiO_2)_{20}$ layer enters the portion digged by sputter etching of the recording film and an effect of preventing the melted recording film from flowing can be expected.

The recording and reproduction of information from the disk formed as mentioned above are performed in the same way as with Embodiment 1.

Embodiment 7

A disk is formed in the same way as with Embodiment 1. A phase change type recording film comprising Ge-Sb-Te is used as a recording film.

Figure 14:
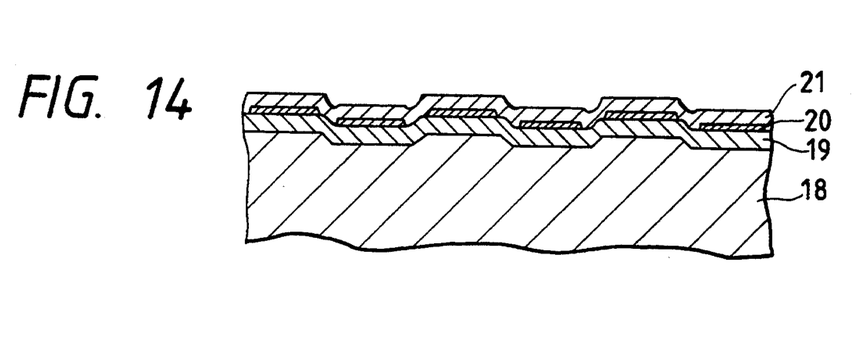
FIG. 14 is a sectional view of a part of the recording film wherein the recording tracks are separated.

As shown in FIG. 14, a lower protective layer 19 is formed on a substrate 18 in the same way as with Embodiment 1 and a phase change type recording film comprising Ge-Sb-Te 20 is formed on the layer as a recording film. Then, a SnS layer is formed on the above surface as a second film which serves as a mask for etching. The film structure of the tilted portion of the tracking groove of the recording film and the SnS layer is irregular. When the SnS layer is spatter-etched thereafter, both the SnS layer and the recording film in this portion disappear and the recording film is separated into each track. An upper protective layer 21 is additionally formed on the recording film in the same way as with Embodiment 1. Furthermore, a metal reflective layer is deposited on this protective layer. By doing this, when the information is rewritten by overwriting, the neighboring track is prevented from erasing due to thermal conduction and high density recording is available. The recording film in a V-shaped groove can also be removed in the same way. The recording film may be directly spatter-etched without a second film being formed. These methods can be applied to a magneto-optic recording film comprising Tb-Fe-Co almost in the same way.

In this embodiment, there is no possibility that when dents are large, the noise increases. Therefore, the full width at half maximum of dents or protrusions whichever larger may not be less than a half of the full width at half maximum of the smallest of the dent indicating the address or the synchronizing signal.

Embodiment 8

A disk is formed in the same way as with Embodiment 1. A phase change type recording film comprising Ge-Sb-Te is used as a recording film. The shape of tracking grooves of the substrate is V.

A lower protective layer is formed in the same way as with Embodiment 1 and a phase change type recording film comprising Ge-Sb-Te is formed on the layer as a first recording film. Then, a SnS layer is formed on the above surface as a second film which serves as a mask. The film structure of the tracking groove of the recording film and the SnS layer is irregular. When the SnS layer is spatter-etched thereafter, both the SnS layer and the recording film in the groove disappear and the recording film is separated into each track. The recording film may be directly spatter-etched without a second film being formed. After the recording film is separated, a phase change type recording film comprising Ge-Sb-Te which has a different composition ratio is deposited as a second recording film. By doing this, double layered recording films are obtained between the grooves and single layered recording film is obtained in each groove. Furthermore, an upper protective layer and a metal reflective layer are deposited on the above second recording film.

For the above recording material, information is read by two wavelengths. When the information written between the grooves is read by one wavelength, for example, the information written in each groove cannot be seen because the reflectance of the light of this wavelength in the amorphous state is equal to the reflectance in the crystalline state. Inversely, when the information written in each groove is read by another wavelength the information written between the grooves cannot be seen because the reflectance of this wavelength in the amorphous state is equal to the reflectance in the crystalline state.

In this embodiment, there is no possibility that when dents are large, the noise increases. Therefore, the full width at half maximum of dents or protrusions whichever larger may not be less than a half of the full width at half maximum of the smallest of the dent indicating the address or the synchronizing signal.

Embodiment 9

A disk is formed almost in the same way as with Embodiment 1 except float a master disk for forming dents and/or protrusions on the substrate surface wherein the shape of cross section of grooves for tracking is U and the groove depth varies periodically in a cycle of about 2 microns in the track direction is used. These grooves are not grooves any more actually but pit arrays lined up in the track direction. A phase change recording film comprising Ge-Sb-Te is used as a recording film.

A lower protective layer is formed in the same way as with Embodiment 1 and a phase change recording film comprising Ge-Sb-Te is formed on the layer as a recording film. Then, a SnS layer is formed on the above surface as a second film which serves as a mask. Since SnS particles are incident perpendicularly to the substrate surface when the SnS layer is formed by spattering, the film is thin and the film structure is irregular in tile tilted portion of each groove and in the tilted portion in the periodic groove depth variation in the track direction. When the layers are spatter-etched thereafter, both the SnS layer and the recording film in the tilted portions disappear and the recording film is separated into tracks and also separated periodically in the track direction. Since the recording film is thin and the film structure is irregular in the tilted portions, the recording film may be directly spatter-etched without the second film being formed.

By doing this, the recording film which is separated into recording positions is obtained. After these processes, an upper protective layer and a metal reflective layer are deposited. The cross sectional view perpendicular to the track is the same as the cross sectional view in FIG. 14. The cross sectional view at the center of the track in parallel with the track is also the same as the cross sectional view in FIG. 14. By obtaining a clock signal from the periodical change in the depth of the grooves and recording correctly positioning in the each separated recording film, high density recording can be achieved.

In this embodiment, although dents are large, there is no possibility that the noise increases because each recording point coincides with each dent or protrusion position. Therefore, the full width at half maximum of dents or protrusions whichever larger may not be less than a half of the full width at half maximum of the dent indicating the address or the synchronizing signal whichever smaller.

Although the embodiments mentioned above describe disk type information recording members, this invention can be applied to other information recording members such as tape type and card type.

Because this invention can block a flow of the recording thin film almost completely for the phase-change optical disk, the effect of improving the rewriting cyclability remarkably exists. And the remainder of data not erased can be reduced because the size of crystal grains is limited. Further, because crystallization occurs partially when unevenness or dents are formed on the surface of a recording thin film, the initial crystallization of the recording thin film conventionally necessary becomes unrequired or simplified.

The above partial crystallization is effective in improving the fidelity of a reproduced signal for the phase change optical disk and increasing the recording sensitivity. Particularly for a magneto-optical disk or a disk using alloy formable double layered films for recording, this invention is greatly effective in improving the fidelity of a reproduced signal by preventing the thermal conduction within the recording film and increasing the recording sensitivity. Additionally, because the expansion of the lines of magnetic force inside of the recording thin film plane is blocked for the magneto-optical disk and magnetic disk, that is, shape unisotropy exists, even recording thin film composition having small perpendicular magnetic unisotropy can be magnetized in perpendicular direction, so as to expand the allowable range of the disk composition.

What is claimed is:

1. An information recording medium comprising at least a substrate and an information recording film which is mounted on said substrate and has a physical property thereof changed under irradiation of a recording energy beam, the information recording medium having at least one recording track, the at least one recording track extending in a first direction, wherein a surface of an information recordable area of said substrate is uneven, both surfaces of said recording film are also uneven, and at least one inorganic protective layer is provided in contact with at least one surface of said recording film, wherein unevenness of the surface of the information recordable area of the substrate and of both surfaces of the recording film extend in the first direction and in a direction perpendicular to the first direction, the surface of the information recording film furthest from the substrate having dents, wherein the surface of the substrate further includes an arrangement of dents and protrusions for providing information on a synchronizing signal for at least one of writing and reading, said arrangement of dents and protrusions of the surface of the substrate being in addition to said unevenness of the surface of the substrate, and wherein a surface of the inorganic protective layer furthest from the substrate is even and the dents in the information recording film furthest from the substrate are filled completely by the inorganic protective layer.

2. An information recording medium according to claim 1, wherein the surface of the information recordable area of the substrate that is uneven has dents and protrusions, and said recording film exists on both the dents and protrusions of said uneven surface.

3. An information recording medium according to claim 1, wherein a size of the dents or protrusions of said uneven surface is almost equal to a size of recording points.

4. An information recording medium according to one of claims 2 to 3, wherein said recording film is thin, as compared to other parts of the recording film, or is substantially not positioned, on areas of the substrate surface between the dents and protrusions of said uneven surface.

5. An information recording medium according to claim 1, wherein at least one protective layer is provided between the substrate and the information recording film.

6. An information recording medium according to claim 1, wherein the information recording film is polycrystalline.

7. An information recording medium according to claim 1, wherein the information recording film has a columnar structure.

8. An information recording medium comprising at least a substrate and an information recording film which is mounted on said substrate and has a physical property thereof changed under irradiation of a recording energy beam, the information recording film including multiple layers, the information recording medium having at least one recording track, the at least one recording track extending in a first direction, wherein a surface of an information recordable area of said substrate is uneven, both surfaces of said recording film are also uneven, and at least one inorganic protective layer is provided in contact with at least one surface of said recording film, wherein unevenness of the surface of the information recordable area of the substrate and of both surfaces of the recording film extend in the first direction and in a direction perpendicular to the first direction, and wherein the surface of the substrate further includes an arrangement of dents and protrusions for providing information on a synchronizing signal for at least one of writing and reading, said arrangement of dents and protrusions of the surface of the substrate being in addition to said unevenness of the surface of the substrate.

* * * * *